United States Patent
Malzahn

(10) Patent No.: US 6,498,817 B1
(45) Date of Patent: Dec. 24, 2002

(54) CIRCUIT FOR PROCESSING DATA SIGNALS

(75) Inventor: Ralf Malzahn, Seevetal (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/555,302

(22) PCT Filed: Sep. 24, 1999

(86) PCT No.: PCT/EP99/07452

§ 371 (c)(1),
(2), (4) Date: May 26, 2000

(87) PCT Pub. No.: WO00/19608

PCT Pub. Date: Apr. 6, 2000

(30) Foreign Application Priority Data

Sep. 30, 1998 (DE) .......................... 198 44 929

(51) Int. Cl.⁷ .............................. H04L 27/00
(52) U.S. Cl. ...................................... 375/259
(58) Field of Search ................ 375/259, 354, 375/360, 362, 368, 371, 376, 377, 226; 326/93, 96; 331/1 H, 2, 11; 327/106, 141, 107; 365/233, 189.05

(56) References Cited

U.S. PATENT DOCUMENTS

| | | | |
|---|---|---|---|
| 4,501,002 A | 2/1985 | Auchterlonie | 375/86 |
| 4,730,265 A | 3/1988 | Bjornholt | 364/602 |
| 5,117,135 A | 5/1992 | Lee et al. | 307/514 |
| 5,331,669 A | 7/1994 | Wang et al. | 375/118 |
| 5,574,732 A | 11/1996 | Hsieh et al. | 371/27 |
| 5,652,536 A * | 7/1997 | Nookala et al. | 327/298 |
| 5,798,661 A * | 8/1998 | Runaldue et al. | 327/106 |
| 5,867,036 A * | 2/1999 | Rajsuman | 326/16 |
| 5,883,529 A * | 3/1999 | Kumata et al. | 326/93 |
| 5,999,086 A * | 12/1999 | Ecker | 340/146.2 |
| 6,031,396 A * | 2/2000 | Hoshen et al. | 326/93 |
| 6,127,864 A * | 10/2000 | Mavis et al. | 327/144 |
| 6,151,356 A * | 11/2000 | Spagnoletti et al. | 375/226 |

FOREIGN PATENT DOCUMENTS

| | | | |
|---|---|---|---|
| DE | 31212970 A1 | 5/1983 | G01R/25/00 |
| DE | 3324820 A1 | 1/1985 | H03K/13/00 |
| DE | 3623263 A1 | 1/1987 | G09F/9/00 |
| DE | 3539129 A1 | 5/1987 | G06F/9/34 |
| DE | 3942431 A1 | 6/1990 | H04L/7/02 |
| EP | 002020236 A1 | 12/1980 | H04L/7/02 |
| EP | 0089596 A1 | 9/1983 | G06F/1/04 |
| EP | 0164785 A1 | 12/1985 | H03L/7/08 |
| EP | 0390452 A2 | 10/1990 | H04J/3/06 |
| EP | 0390452 A3 | 10/1990 | H03K/3/037 |
| EP | 0396461 A1 | 11/1990 | H04L/25/49 |
| EP | 0658995 A1 | 6/1995 | H04L/7/033 |
| EP | 0716501 A1 | 6/1996 | H03D/13/00 |
| GB | 2062915 A | 5/1981 | G06F/7/00 |
| GB | 2089601 A | 6/1982 | H03D/13/00 |
| GB | 2209908 A | 5/1989 | H03M/5/12 |
| GB | 2233177 A | 1/1991 | H03L/7/00 |
| JP | 06311153 | 11/1994 | H04L/7/33 |
| JP | 07038535 | 2/1995 | H04L/1/00 |
| JP | 09284058 | 10/1997 | H03D/13/00 |
| WO | 9107015 A1 | 5/1991 | H03K/19/173 |

* cited by examiner

Primary Examiner—Chi Pham
Assistant Examiner—Emmanuel Bayard
(74) Attorney, Agent, or Firm—Daniel J. Piotrowski

(57) ABSTRACT

The invention relates to a circuit arrangement which includes a stage for the processing of data signals which are applied to the stage in a selectable sequence during time intervals defined by a clock signal.

In order to construct a circuit arrangement of this kind in such a manner that the power consumption which is dependent on the data signals is disguised, the invention proposes to supply the circuit arrangement, with modified data signals, instead of the data signals to be processed, in a respective part of each time interval.

7 Claims, 2 Drawing Sheets

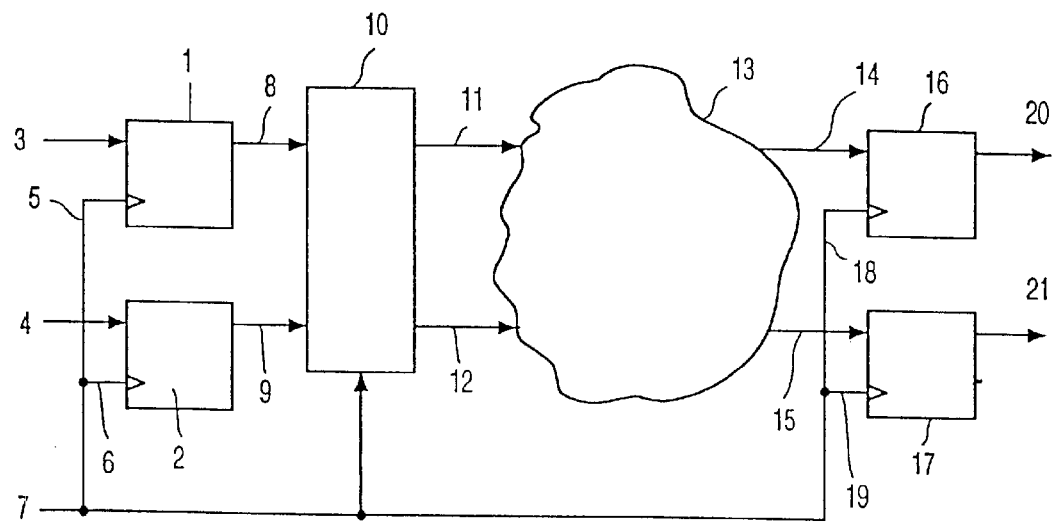
FIG. 1

FIG. 4C

CIRCUIT FOR PROCESSING DATA SIGNALS

BACKGROUND OF THE INVENTION

1. Field of the Invention

The invention relates to a circuit arrangement which includes a stage for the processing of data signals which are applied to the stage in a selectable sequence during time intervals which are defined by a clock signal.

2. Description of the Related Art

Circuit arrangements of this kind are used in a wide variety of digital switching circuits which process data. Notably when such circuit arrangements, or their elements, are constructed while using CMOS circuits their current consumption can be strongly reduced, because such CMOS circuits, and gates constructed using such circuits, consume current only when value of the data signals occurring therein changes. Consequently, the current consumption of a circuit arrangement thus constructed is dependent on the changes of the data signals. This could make it possible to extract information as regards the changes of the data, and hence as regards the data themselves, from the variation in time of the current consumption. Such information, however, should not be surrendered, notably not in the case of data signals which are to be kept secret.

This problem becomes acute when parts of synchronously operating logic circuits are clocked only conditionally in order to save current, i.e. only when the relevant circuit element is indeed used for the current data signal processing. It is exactly this aim to minimize the current consumption that makes dependencies of the current consumption on the data signals particularly noticeable. Such switching circuits exhibit distinct dependencies of the electrical power consumption on the processed data signals.

SUMMARY OF THE INVENTION

It is an object of the invention to construct a circuit arrangement of the kind set forth in such a manner that the dependency of the power consumption on the data signals is disguised.

This object is achieved in a circuit arrangement of the kind set forth in that in a respective part of each time interval the circuit arrangement is supplied with modified data signals instead of the data signals to be processed.

In accordance with the invention, the described circuit arrangement is thus supplied with other, as different as possible data before processing the actually intended data. It can thus be achieved that the number of switching operations in the circuit arrangement is approximately the same in each time interval, irrespective of whether and how much the data signals to be actually processed change and what values they assume. This results in a power consumption which can no longer be correlated with the processing of the actual data signals.

The invention offers the advantage that the same circuit arrangement is used for the actual task, i.e. for the data signals to be actually processed, as well as for causing an additional current consumption by the processing of modified data signals which have an apparent meaning only. This takes place in a kind of time multiplex in each of the time intervals. More specifically, a dummy operation without meaning and the operation involving the actual data signals to be processed are thus performed sequentially.

When the time intervals are defined, for example by a square-wave clock signal, the modified data signals can be processed in a respective half period of the clock signal and the data signals to be actually processed in the respective other half period of the clock signal. The modified data signals, however, can also be supplied and processed in time intervals which are short in comparison with the period of the clock signal and are situated at the area of, for example the edges of the clock signal, whereas the data signals to be actually processed are supplied during the remaining time intervals of the periods of the clock signal.

The invention achieves a very effective disguise while using very few circuit means. This is realized at the expense of a slightly increased current consumption.

Preferably, the modified data signals are derived from the data signals to be actually processed by means of a data modification device which is controlled by the clock signal and can be simply inserted in the paths for the data signals. Preferably, such a data modification device includes an exclusive-OR circuit or a multiplexer device. A preferred embodiment of the circuit arrangement according to the invention includes a combinatory logic circuit which is inserted in the stage for the processing of the data signals. This combinatory logic circuit may be connected so as to precede the data modification device. The data signals to be processed can be applied from a first storage device to the combinatory logic circuit via the data modification device, the data signals formed in the combinatory logic circuit being applied to a second storage device so as to be stored.

Particularly advantageous is the use of the circuit arrangement according to the invention in combination with CMOS circuits. The application, however, is in principle not restricted to such circuits.

Disguising is achieved notably in that the combinatory logic circuit must process new data signals in each time interval, i.e. in that these data signals change under the influence of the data modification device. This precludes pronounced differences in the power consumption of the circuit arrangement for different time intervals, which differences could arise, for example, when the data signals to be processed contain very few changes only.

BRIEF DESCRIPTION OF THE DRAWINGS

The drawings show an embodiment of the invention which will be described in detail hereinafter.

FIG. 1 shows a block diagram of an embodiment of the present invention.

FIGS. 4A–4E show a number of signal variations in the circuit arrangement shown in FIG. 1.

DETAILED DESCRIPTION OF THE PREFERRED EMBODIMENT

Figure 4A:
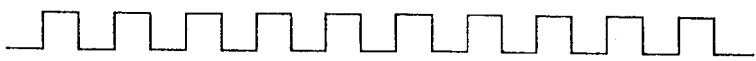
Figure 4B:
Figure 4D:
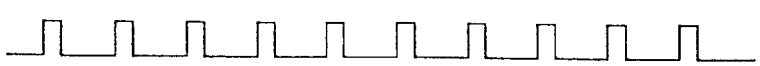
Figure 4E:
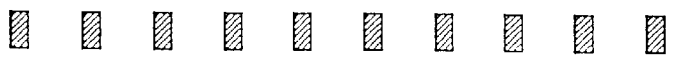

The circuit arrangement shown in FIG. 1 includes a first storage device which consists of two D-flipflops 1, 2 whose data inputs 3, 4 receive the data signals to be processed. A clock signal is supplied from a clock signal terminal 7 via clock inputs 5, 6. The data signals to be processed, stored in the first storage device 1, 2, are output via data outputs 8, 9.

From the data outputs 8, 9 the data signals to be processed reach, via a data modification device 10 and leads 11 and 12, respectively, a combinatory logic circuit 13 and from the outputs 14, 15 thereof they are applied to a second storage device which includes two D-flipflops 16, 17. The D-flipflops 16, 17 also receive the clock signal from the clock signal terminal 7 via clock inputs 18, 19. They output the stored data signals via data outputs 20 and 21, respectively.

Figure 2:
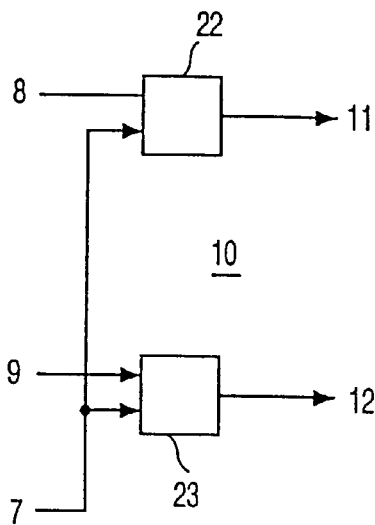
FIGS. 2 and 3 show aspects of the data modification device for the embodiment shown in FIG. 1.

FIG. 2 shows a first embodiment of the data modification device 10. It includes exclusive-OR gates 22 and 23 which are connected between one of the data outputs 8 and 9 and a respective one of the leads 11 and 12. Via each of the exclusive-OR gates 22,23 one of the data signals is conducted from the first storage device 1,2 to the combinatory logic circuit 13. A second input of each exclusive-OR gate 22,23 is connected to the clock signal terminal 7. As a result, the modified data signals are generated by means of the clock signal in each half period. The data signals on the leads 11, 12, and hence on the outputs 14, 15 of the combinatory logic circuit 13, thus are first modified at the beginning of each clock signal period and the data signals to be actually processed are transferred only in the second part of the clock signal period. The embodiment shown in FIG. 2 is notably constructed in such a manner that the exclusive-OR gates 22,23 invert the data signals, supplied via the data outputs 8,9 of the first storage device 1,2 in the case of a high level on the clock signal terminal 7 and conducts these signals without modification in the case of a low level on the clock signal terminal 7.

The data modification device 10 in a second embodiment includes four AND gates 24, 25, 26 and 27, two OR gates 28 and 29 and an inverter 30. A first input of the first and of the third AND gate 24, 26 is connected to the data output 8. A first input of the second and of the fourth AND gate 25, 27 is connected to the data output 9. A second input of the first and of the fourth AND gate 24, 27 is connected to the output of the inverter 30 and the input of the inverter 30 is connected to the clock signal terminal 7 and to a second input of the second and of the third AND gate 25, 26. The outputs of the first and the second AND gate 24, 25 are connected to a respective input of the first OR gate 28 whose output is connected to the lead 11. Analogously, the outputs of the third and the fourth AND gate 26, 27 are connected to inputs of the second OR gate 29 whose output is connected to the lead 12. The multiplexer arrangement thus formed permutates the data signals from the data outputs 8, 9 in the case of a high level on the clock signal terminal 7.

Figure 3:
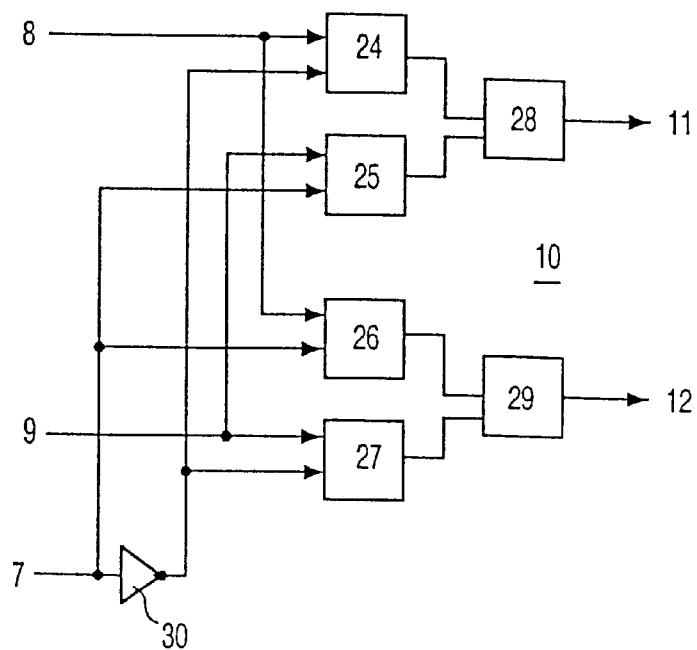

FIG. 4 shows, by way of example, some signal variations illustrating the operation of the circuit arrangements shown in the FIGS. 1 to 3. FIG. 4a) shows a square-wave clock signal with a mark-space ratio 1. FIG. 4b) shows, by way of shading, the parts of the clock signal periods during which the data modification devices shown in the FIGS. 2 and 3 perform a permutation or modification of the data signals. Therein, each clock signal period commences with an ascending edge of the clock signal shown in FIG. 4a).

FIG. 4c) shows a clock signal with a mark-space ratio smaller than 1. For example, this clock signal can be derived from the clock signal shown in FIG. 4a). When such a clock signal is used to control a data modification device as shown in the FIGS. 2 or 3, the modified data signals will be generated in the parts of the clock signal periods which are denoted by shading in FIG. 4d). These parts have been shortened relative to those shown in FIG. 4b) so that, for example, in each clock signal period the combinatory logic circuit 13 has a longer period of time available for the processing of the data signals to be actually processed.

In third example a short period of time within which the data signals are modified can be formed for each edge of the clock signal shown in FIG. 4a). This is symbolically represented in FIG. 4e).

What is claimed is:

1. A circuit arrangement which includes a stage for the processing of data signals which are applied to the stage in a selectable sequence during time intervals which are defined by a clock signal, wherein in a respective part of each time interval the circuit arrangement is supplied with modified data signals instead of the data signals to be processed, wherein the modified data signals are supplied only to mask power consumption of the data signals to be processed.

2. A circuit arrangement as claimed in claim 1, further comprising a data modification device which is controlled by the clock signal and serves to generate the modified data signals from the supplied data signals.

3. A circuit arrangement as claimed in claim 2, characterized in that the data modification device includes an exclusive-OR circuit.

4. A circuit arrangement as claimed in claim 2, characterized in that the data modification device includes a multiplexer device.

5. A circuit arrangement as claimed in claim 1, characterized in that the stage for the processing of data signals includes a combinatory logic circuit.

6. A circuit arrangement as claimed in claim 2 further comprising a first storage device wherefrom the data signals are applied, via the data modification device, to a combinatory logic circuit, as well as a second storage device for the storage of data signals output by the combinatory logic circuit.

7. A circuit arrangement as claimed in claim 1 which is constructed from CMOS circuits.

* * * * *